United States Patent
Noh et al.

(10) Patent No.: US 9,500,399 B2
(45) Date of Patent: Nov. 22, 2016

(54) WATER PURIFIER WITH ICE MAKER

(75) Inventors: Jin Hwan Noh, Seoul (KR); Hee-Do Jung, Seoul (KR)

(73) Assignee: Woongjin Coway Co., Ltd (KR)

( * ) Notice: Subject to any disclaimer, the term of this patent is extended or adjusted under 35 U.S.C. 154(b) by 0 days.

(21) Appl. No.: 13/388,812

(22) PCT Filed: Jun. 22, 2010

(86) PCT No.: PCT/KR2010/004041
§ 371 (c)(1),
(2), (4) Date: Feb. 3, 2012

(87) PCT Pub. No.: WO2011/019137
PCT Pub. Date: Feb. 17, 2011

(65) Prior Publication Data
US 2012/0125034 A1 May 24, 2012

(30) Foreign Application Priority Data

Aug. 13, 2009 (KR) .................. 10-2009-0074683

(51) Int. Cl.
*F25C 5/10* (2006.01)
*F25C 1/08* (2006.01)

(52) U.S. Cl.
CPC . *F25C 5/10* (2013.01); *F25C 1/08* (2013.01); *F25C 2400/04* (2013.01); *F25C 2400/14* (2013.01); *Y02P 60/855* (2015.11)

(58) Field of Classification Search
CPC ........... F25C 1/08; F25C 5/10; F25C 2400/14; F25C 2400/04
USPC ......................................... 62/347, 353, 345
See application file for complete search history.

(56) References Cited

U.S. PATENT DOCUMENTS

| | | | |
|---|---|---|---|
| 4,995,245 A | * | 2/1991 | Chang ............................ 62/515 |
| 2001/0045276 A1 | * | 11/2001 | Ohashi .......................... 165/170 |
| 2004/0107721 A1 | * | 6/2004 | Choi et al. ...................... 62/340 |
| 2004/0129625 A1 | * | 7/2004 | Wang ......................... 210/323.1 |
| 2004/0163404 A1 | * | 8/2004 | Berrow ........................... 62/340 |
| 2004/0237567 A1 | * | 12/2004 | Nagasawa et al. ............. 62/347 |

(Continued)

FOREIGN PATENT DOCUMENTS

| | | |
|---|---|---|
| CN | 1936465 | 3/2007 |
| KR | 19990041499 | 12/1999 |

(Continued)

OTHER PUBLICATIONS

PCT/ISA/237 Written Opinion issued on PCT/KR2010/004041 (pp. 4).
PCT/ISA/210 Search Report issued on PCT/KR2010/004041 (pp. 3).

*Primary Examiner* — Judy Swann
*Assistant Examiner* — Zachary R Anderegg
(74) *Attorney, Agent, or Firm* — The Farrell Law Firm, P.C.

(57) ABSTRACT

A water purifier with an ice maker is provided that may include an ice making part (200) having an evaporator (210) and a circulation cooling part (300) that circulates water stored in a cold water tank (310) to the evaporator (210) so that the water stored in the cold water tank (310) is cooled by performing a heat exchange with refrigerant flowing in the evaporator (210). With the configurations as described above, it is possible to simultaneously make ice and cool water using a single evaporator. Therefore, there is no need to make separate ice so as to cool water, thereby making it possible to enhance the energy efficiency of the water purifier with an ice maker.

10 Claims, 3 Drawing Sheets

(56) References Cited

U.S. PATENT DOCUMENTS

2007/0089451 A1 4/2007 Lee
2008/0250796 A1* 10/2008 Clugston et al. ................ 62/66

FOREIGN PATENT DOCUMENTS

| KR | 100814613 | 3/2008 |
| KR | 200440254 | 5/2008 |
| KR | 2020080006427 | 12/2008 |
| WO | WO 2008156287 | 12/2008 |

* cited by examiner

WATER PURIFIER WITH ICE MAKER

TECHNICAL FIELD

The present invention relates to a water purifier with an ice maker.

BACKGROUND ART

A water purifier with an ice maker is a water purifier that includes a filtering part that has at least one water purifying filter to filter introduced water and an ice making part that makes ice.

The ice making part of such a water purifier with an ice maker is provided with an evaporator in which cold refrigerants heat-exchanged with water and making ice flow. The evaporator provided to the water purifier with an ice maker according to the prior art does not make ice using all side surfaces of the evaporator but merely makes ice using only one side surface. Therefore, the rest of the side surfaces other than one side surface of the evaporator that makes ice cannot be used, such that the energy efficiency of the water purifier with an ice maker is degraded.

Meanwhile, in the water purifier with an ice maker according to the prior art, ice made in the ice making part is dropped to a cold water tank in which water is stored so as to cool the water stored in the cold water tank. When the water stored in the cold water tank is cooled using the ice made in the ice making part, however, ice is to be separately made so as to cool the water stored in the cold water tank. Therefore, the energy efficiency of the water purifier with an ice maker is also degraded.

DISCLOSURE OF INVENTION

Technical Problem

The present invention proposes by recognizing at least any one of requirements or problems generated in the water purifier with an ice maker according to the prior art.

An aspect of the present invention is to simultaneously make ice and cool water using a single evaporator.

An aspect of the present invention is also to remove the necessity of making separate ice so as to cool water.

An aspect of the present invention is also to enhance the energy efficiency of a water purifier with an ice maker.

Solution to Problem

A water purifier with an ice maker related to an embodiment for accomplishing at least one of the problems may include the following characteristics.

The present invention is basically configured such that water stored in a cold water tank is cooled by circulating the water stored in the cold water tank from the cold water tank to an evaporator.

According to an aspect of the present invention, there is provided a water purifier with an ice maker, including: an ice making part having an evaporator and making ice; and a circulation cooling part configured to circulate water stored in a cold water tank to the evaporator so that the water stored in the cold water tank is cooled by performing a heat exchange with refrigerants flowing in the evaporator.

In this case, the ice making part may include the evaporator connected to a refrigerating system and in which the refrigerants flow; a plurality of ice making members connected to the evaporator and in which the refrigerants flow to make the ice; and an ice storage compartment in which the ice made in the ice making member is stored.

Further, the circulation cooling part may include the cold water tank into which water is introduced to be stored; a pump connected to the cold water tank; and a flow pipe of which one side is connected to the pump and the other side is connected to the cold water tank, the flow pipe passing the evaporator, while being in contact therewith, so that the water flowing in the flow pipe performs a heat exchange with the refrigerants flowing in the evaporator.

Meanwhile, a valve may be provided on the flow pipe to prevent water from flowing when hot refrigerants flow in the evaporator and the ice making member, so as to drop the ice made in the ice making member included in the ice making part.

Further, a support plate may be provided on the evaporator and the flow pipe may be provided on the support plate.

The flow pipe may be formed on the support plate to have a zigzag shape.

The ice making part may further include a tray member in which water is provided and the ice making member is sunk into the water to make ice.

The tray member may be supplied with water from a water purifying tank in which water filtered by passing through at least one water purifying filter is stored.

The tray member may be supplied with the water stored in the cold water tank.

Further, the tray member may include a main tray member and a sub tray member connected to the main tray member.

Advantageous Effects of Invention

As set forth above, according to exemplary embodiments of the present invention, it is possible to simultaneously make ice and cool water using a single evaporator.

In addition, according to exemplary embodiments of the present invention, there is no need to make separate ice so as to cool water.

In addition, according to exemplary embodiments of the present invention, there is no need to make separate ice, thereby making it possible to enhance the energy efficiency of the water purifier with an ice maker.

MODE FOR THE INVENTION

Figure 1:
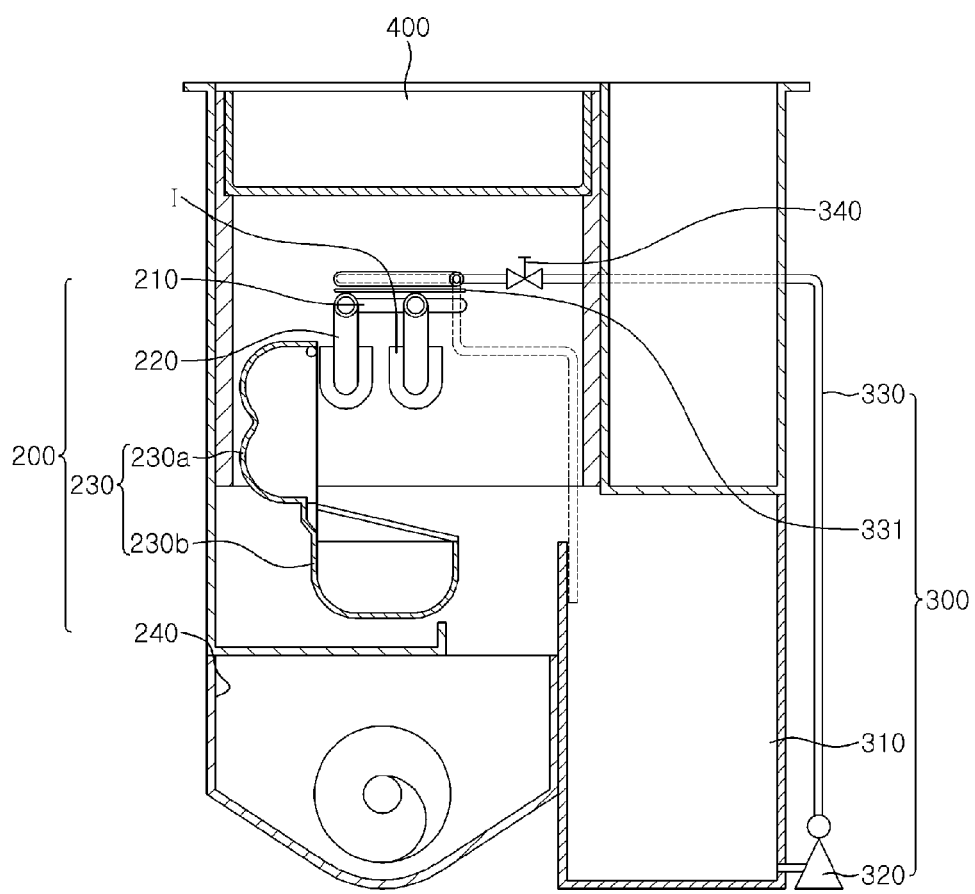
FIG. 1 is a cross-sectional view showing an embodiment of a wafer purifier with an ice maker according to the present invention.

In order to help understand the features described above of the present invention, hereinafter, a water purifier with an ice maker will be described in detail with reference to embodiments of the present invention.

Hereinafter, although the following embodiments will be described on the basis of examples that are the most suitable for understanding the technical features of the present invention, the present invention is not limited to the embodiments and it is exemplified that the present invention may be achieved by the embodiments. Therefore, the present invention may be modified from the following embodiments in various ways within the scope of the present invention and it should be understood that the modified embodiments are included in the scope of the present invention. Further, in the reference numerals provided in the accompanying drawings to help understand the following embodiments, the same or extending reference numerals indicate related components among the components that have the same function in each embodiment.

The embodiments according to the present invention are basically configured such that water stored in a cold water tank is cooled by circulating the water stored in the cold water tank from the cold water tank to an evaporator. As shown in FIG. 1, a water purifier with an ice maker 100 according to the present invention may be configured to include an ice making part 200 and a circulation cooling part 300.

The ice making part 200 has an evaporator 210 and makes ice I. The ice making part 200 may include the evaporator 210, an ice making member 220, a tray member 230, and an ice storage compartment 240, as shown in FIG. 1.

The evaporator 210 is connected to a refrigerating system (not shown) and in which refrigerants may flow, as shown in FIG. 1. In the evaporator 210, cold refrigerants may flow at the time of ice making and hot refrigerants may flow at the time of ice dropping to be described below.

A plurality of ice making members 220 may be connected to the evaporator 210 as shown in FIG. 1, wherein refrigerants may flow therein similar to the evaporator 210. In the ice making member 220, cold refrigerants may flow at the time of ice making and hot refrigerants may flow at the time of ice dropping, similar to the evaporator 210. The cold refrigerants flowing in the ice making member 220 may be heat-exchanged with the water provided to the tray member 230 to make ice I in the ice making member 220 to be described below. In addition, when the making of the ice I is completed in the ice making member 220, the hot refrigerants flowing in the ice making member 220 may flow in the ice making member 220 to allow the ice I made in the ice making member 220 to be detached from the ice making member 220.

Figure 3:
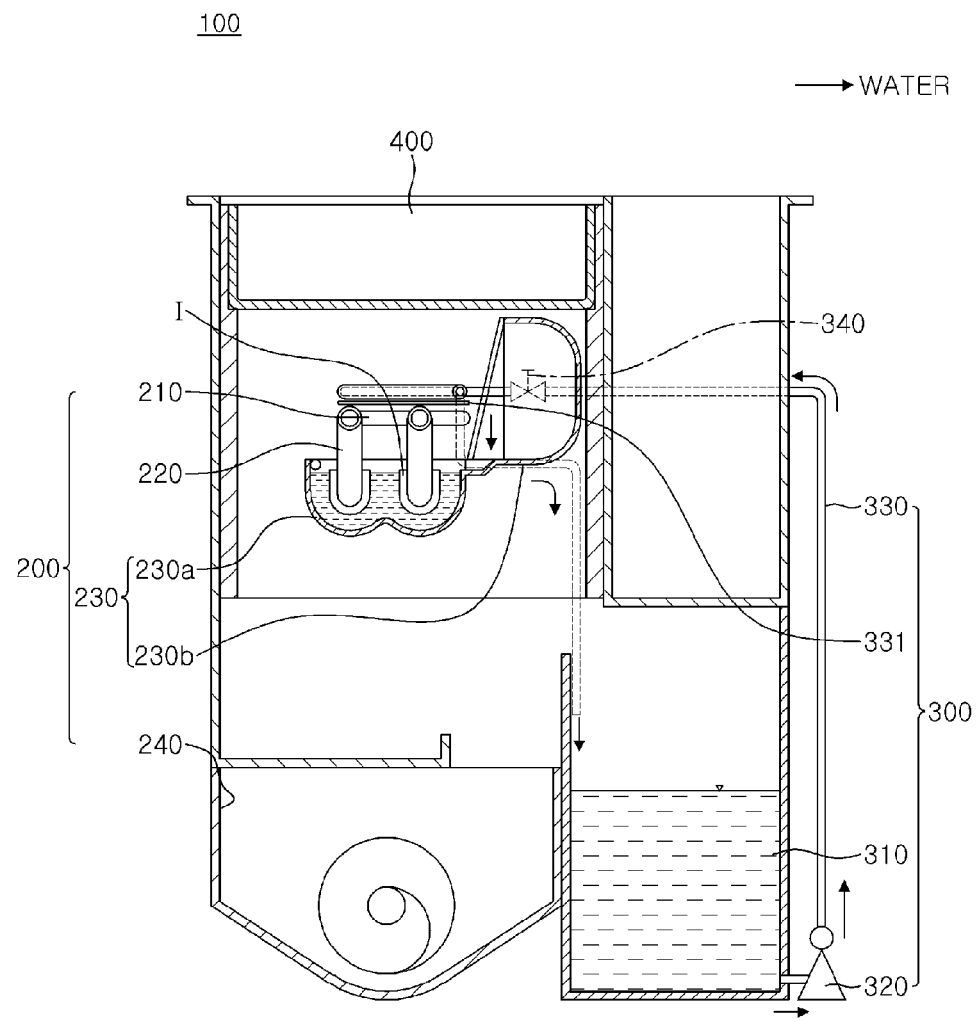
FIG. 3 is a diagram showing an operation of an embodiment of a water purifier with an ice maker according to the present invention, that is, the diagram showing ice making.

As shown in FIGS. 1 and 3, water is provided to the tray member 230 and the ice making member 220 is sunk into the water provided to the tray member 230 to make the ice I. In other words, when the ice making member 220 is sunk into the tray member 230 in which water is provided, the ice I may be made in the ice making member 220 by the heat exchange between the cold refrigerants flowing in the ice making member 220 and water neighboring the ice making member 220.

Meanwhile, the tray member 230 may be configured of a main tray member 230a and a sub tray member 230b connected to the main tray member 230a, as shown in FIG. 1. When the tray member 230 rotates for ice making, water may be provided to the main tray member 230a and the ice making member 220 may be sunk into the water provided to the main tray member 230a. When the tray member 230 rotates for ice dropping, the water in the main tray member 230a moves to the sub tray member 230b and the ice I made in the ice making member 220 is detached and dropped, such that the sub tray member 230b may guide the ice I to the ice storage compartment 240. However, the configuration of the tray member 230 is not limited to the embodiment, and any configuration thereof in which water is provided and the ice making member 220 is sunk into the water to make the ice I may also be used.

In the embodiment, it is configured such that water is supplied from a water purifying tank 400 in which water filtered by passing through one or more water purifying filter (not shown) is stored to the tray member 230. In other words, in the embodiment, it is configured such that water is supplied from the water purifying tank 400 to the main tray member 230a of the tray member 230 so that the water is put in the main tray member 230a. However, the configuration in which water is supplied and put in the tray member 230 or the main tray member 230a of the tray member 230 is not limited to the configuration in which water is supplied to the tray member 230 or the main tray member 230a of the tray member 230 from the water purifying tank 400 as shown in the embodiment. As a result, any configuration in which water is supplied and put in the tray member 230 or the main tray member 230a of the tray member 230 may be used, such as a configuration in which water is supplied and put in the tray member 230 or the main tray member 230a of the tray member 230 from a cold water tank 310. In the case of the configuration in which water is supplied and put in the tray member 230 or the main tray member 230a of the tray member 230 from a cold water tank 310, the cold water is provided to the tray member 230 or the main tray member 230a of the tray member 230. As a result, the temperature needs to be slightly lowered so as to make ice I in the ice making member 220 so that the ice I can be easily made and thus energy can be saved to that extent.

The ice I made in the ice making member 220 may be stored in the ice storage compartment 240, as shown in FIG. 1. To this end, the ice storage compartment 240 may be positioned under the ice making member 220 so that the ice I made in the ice making member 220 is dropped to be stored in the ice storage compartment 240, as shown in the figure.

The circulation cooling part 300 may be configured such that the water stored in the cold water tank 310 is circulated to the evaporator 210 so that the water stored in the cold water tank 310 is cooled by being heat-exchanged with the refrigerants flowing in the evaporator 210. To this end, the circulation cooling part 300 may include the cold water tank 310, a pump 320, and a flow pipe 330, as shown in FIG. 1.

The cold water tank 310 may be introduced and stored with water, as shown in FIG. 1. In the figure, the cold water tank 310 may receive and store water from the water purifying tank 400 that stores water filtered by passing through one or more water purifying filter (not shown). However, the configuration in which water is introduced and stored in the cold water tank 310 is not limited to the embodiment and any configuration in which water can be introduced and stored in the cold water tank 310 may be used.

The pump 320 may be connected to the cold water tank 310, as shown in FIG. 1. Therefore, the water stored in the cold water tank 310 may be introduced into the flow pipe 330 positioned at a higher position than the cold water tank 310 to be flowed.

Figure 2:
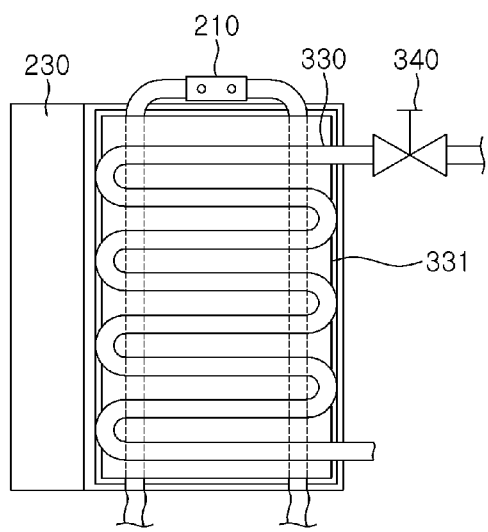
FIG. 2 is a diagram showing an embodiment of a wafer purifier with an ice maker according to the present invention, that is, a plan view showing a configuration in which a flow pipe passes over an evaporator of an ice making part.

One side of the flow pipe 330 may be connected to the pump 320, as shown in FIG. 1. The flow pipe 330 may pass the evaporator 210 of the ice making part 200, while being in contact with the evaporator 210, as shown in FIGS. 1 and 2. Further, the other side of the flow pipe 330 may be connected to the cold water tank 310. Therefore, the water introduced and stored in the cold water tank 310 may be introduced into the flow pipe 330 by the pump 320, and the water flowing in the flow pipe 330 may be cooled, while being heat-exchanged with the cold refrigerants flowing in the evaporator 210 at a portion where the flow pipe 330 passes the evaporator 210, while being in contact therewith. The water cooled by being heat-exchanged with the cold refrigerant flowing in the evaporator 210 may be returned to the cold water tank 310 connected to the other side of the flow pipe 330. As described above, the water stored in the cold water tank 310 may be cooled, while being circulated from the cold water tank 310 to the evaporator 210.

Meanwhile, a valve 340 may be provided on the flow pipe 330, as shown in FIG. 1. The valve 340 provided on the flow pipe 330 may prevent water from flowing in the flow pipe 330 when hot refrigerants flow in the evaporator 210 and the ice making member 220 so as to drop the ice I made in the ice making member 220 of the ice making part 200. In other words, the valve 340 may be opened to allow water to flow in the flow pipe 330 at the time of ice making, and the valve 340 may be closed to prevent water from flowing in the flow pipe 330 at the time of ice dropping.

A support plate 331 may be provided on the evaporator 210, as shown in FIGS. 1 and 2. The flow pipe 330 may be provided on the support plate 331 to have a zigzag shape, as shown in FIG. 2. Therefore, the flow pipe 330 may pass the evaporation 210, while being in contact with the evaporator 210, and the water flowing in the flow pipe 330 can be cooled as the water flowing in the flow pipe 330 is heat-exchanged with the cold refrigerants flowing in the evaporator 210. However, the configuration in which the flow pipe 330 passes the evaporator 210, while being in contact therewith, so that the water flowing in the flow pipe 330 can be cooled as the water flowing in the flow pipe 330 is heat-exchanged with the cold refrigerants flowing in the evaporator 210 is not limited to the embodiment. Any configuration in which the water flowing in the flow pipe 330 can be cooled as the water flowing in the flow pipe 330 is heat-exchanged with the cold refrigerants flowing in the evaporator 210 may be used.

Meanwhile, the support plate 331 may be made of a material having high thermal conductivity for a heat exchange between the water flowing in the flow pipe 330 and the cold refrigerant flowing in the evaporator 210. The support plate 331 may be made of a material having rigidity capable of supporting the flow pipe 330 provided thereon. The support plate 331 is not specially limited but any material having high thermal conductivity and rigidity capable of supporting the flow pipe 330 may be used.

Hereinafter, an operation of an embodiment of a water purifier with an ice maker 100 according to the present invention will be described with reference to FIGS. 3 and 4. At the time of ice making, the tray member 230 rotates to the position as shown in FIG. 3. Then, water is put in the main tray member 230a by supplying water to the main tray member 230a from the water purifying tank 400. As shown in the figure, if water is provided to the main tray member 230a, the ice making member 220 may be sunk into the water put in the main tray member 230a. As described above, if the refrigerating system (not shown) is operated in a state in which the ice making member 220 is sunk into the water put in the main tray member 230a, the cold refrigerants flow in the evaporation 210 and the ice making member 220. Therefore, a heat exchange is performed between the cold refrigerants flowing in the ice making member 220 and the water put in the tray member 230 in which the ice making member 220 is sunk, such that ice I is made in the ice making member 220 as shown in the figure.

At the time of the ice making as described above, the valve 340 provided on the flow pipe 330 is opened. Therefore, the water stored in the cold water tank 310 introduced into one side of the flow pipe 330 and flows in the flow pipe 330 due to the driving of the pump 320. Meanwhile, the flow pipe 330 passes the evaporator 210, while being in contact therewith, as shown in the figure. As described above, the heat exchange is performed between the water flowing in the flow pipe 330 and the cold refrigerants flowing the evaporator 210 in the portion in which the flow pipe 330 passes the evaporator 210, while being in contact therewith, such that the water flowing in the flow pipe 330 is cooled. The water flowing the flow pipe 330 that is cooled by being heat-exchanged with the cold refrigerants flowing in the evaporator 210 is returned to the cold water tank 310 connected to the other side of the flow pipe 330 as shown in the figure. The water stored in the cold water tank 310 is cooled, while being circulated from the cold water tank 310 to the evaporator 210, such that the water stored in the cold water tank 310 may be cooled.

Figure 4:
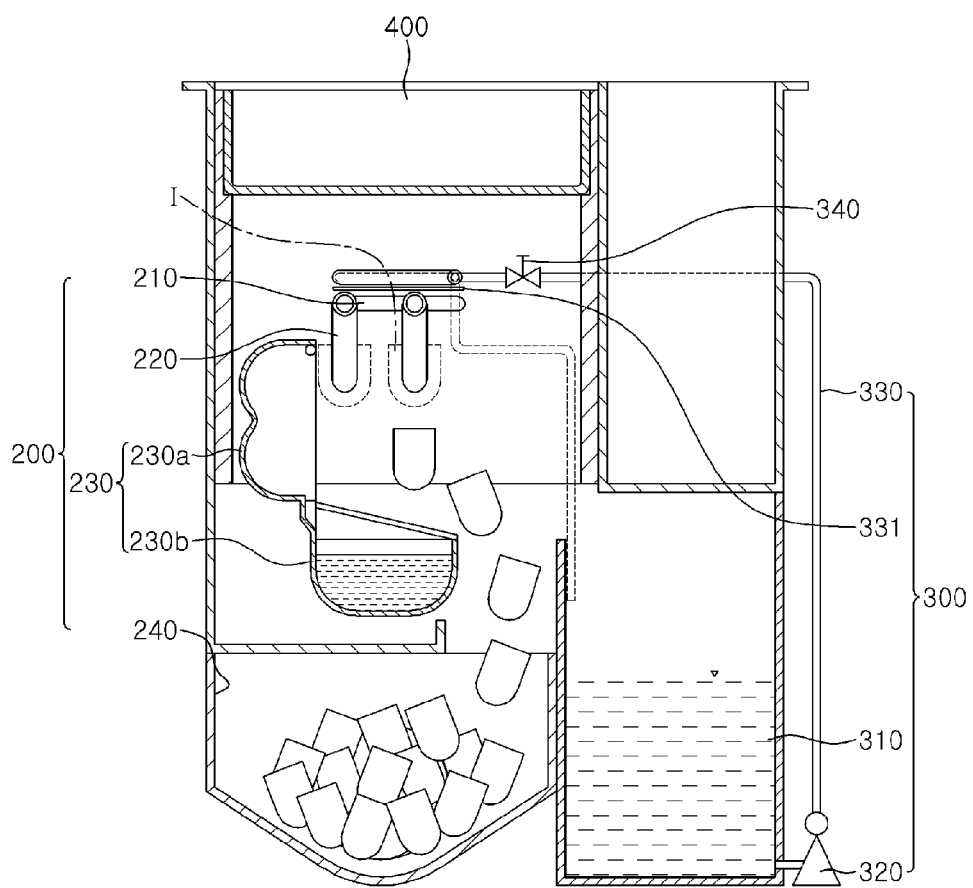
FIG. 4 is a diagram showing an operation of an embodiment of a water purifier with an ice maker according to the present invention, the diagram showing ice dropping.

Meanwhile, at the time of ice dropping, the making of ice I is completed in the ice making member 220, as shown in FIG. 4. When the generation of ice I is completed as described above, the tray member 230 rotates to the position as shown in the figure. In this case, the water put in the main tray member 230a moves to the sub tray member 230b. After the rotation of the tray member 230, the hot refrigerants flow in the evaporator 210 and the ice making member 220. As described above, if the hot refrigerants flow in the evaporator 210 and the ice making member 220, the ice I made in the ice making member 220 is detached from the ice making member 220 to be dropped as shown in the figure. That is, ice dropping occurs. The ice storage compartment 240 is provided under the ice making member 220 as shown in the figure, such that the ice I detached and dropped from the ice making member 220 is dropped to the ice storage compartment 240 to be stored.

Meanwhile, as described above, the hot refrigerants flow in the evaporator 210 and the ice making member 220 at the time of ice dropping, such that the water flowing in the flow pipe 330 cannot be cooled. Therefore, the valve 340 provided on the flow pipe 330 is closed to prevent water from being introduced into and flowing in the flow pipe 330.

As set forth above, according to exemplary embodiment of the present invention, the water purifier with an ice maker 100 is used, it is possible to simultaneously make ice and cool water using a single evaporator. Therefore, there is no need to make separate ice so as to cool water. In addition, there is no need to make separate ice, thereby making it possible to enhance the energy efficiency of the water purifier with an ice maker.

The water purifier with an ice maker as described above is not limited to the above-mentioned embodiments. It is noted that the embodiments can be entirely or partially combined so that various modifications thereof can be made.

The invention claimed is:
1. A water purifier with an ice maker, comprising:
an ice making part (200) having an evaporator (210); and
a circulation cooling part (300) configured to carry out circular cooling in which water stored in a cold water tank (310) is directly heat exchanged with a refrigerant flowing in the evaporator (210) and returned to the cold water tank (310),
wherein the circulation cooling part (300) includes the cold water tank (310) into which water is stored, and a continuous flow pipe (330) having a continuously enclosed interior between two ends, the two ends being directly connected to the cold water tank (310), wherein at least a part of the flow pipe (330) contacts a part of the evaporator (210) so that the water flowing in the flow pipe (330) is cooled by direct heat exchange with the refrigerant flowing in the evaporator (210) through the flow pipe (330) and the evaporator (210), wherein the cooled water returns to the cold water tank (310) through the flow pipe (330), and wherein a portion of the evaporator (210) which comes into contact with the flow pipe (330) is used to cool water flowing in the flow pipe (330), and a portion of the evaporator (210) which does not come into contact with the flow pipe (330) is used to make ice (I).

2. The water purifier with the ice maker of claim 1, wherein the ice making part (200) includes:

the evaporator (210) in which the refrigerant flows;

a plurality of ice making members (220) connected to the evaporator (210) and in which the refrigerant flows to make the ice (I); and an ice storage compartment (240) in which the ice (I) made by the ice making member (220) is stored.

3. The water purifier with the ice maker of claim 1, wherein the circulation cooling part (300) includes:

a pump (320) connected to the cold water tank (310) and the flow pipe (330).

4. The water purifier with the ice maker of claim 3, wherein the valve (340) is provided on the flow pipe (330) to prevent water from flowing when hot refrigerant flows in the evaporator (210) and an ice making member (220) included in the ice making part (200), so as to drop the ice (I) made by the ice making member (220) included in the ice making part (200).

5. The water purifier with the ice maker of claim 3, wherein a support plate (331) is provided on the evaporator (210) and the flow pipe (330) is provided on the support plate (331).

6. The water purifier with the ice maker of claim 5, wherein the flow pipe (330) is formed on the support plate (331) to have a zigzag shape.

7. The water purifier with the ice maker of claim 2, wherein the ice making part (200) further includes a tray member (230) in which water is provided and ice making members (220) are sunk into the water to make ice (I).

8. The water purifier with the ice maker of claim 7, wherein the tray member (230) is supplied with water from a water purifying tank (400) in which water is stored.

9. The water purifier with the ice maker of claim 7, wherein the tray member (230) is supplied with the water stored in the cold water tank (310).

10. The water purifier with the ice maker of claim 7, wherein the tray member (230) includes a main tray member (230*a*) and a sub tray member (230*b*) connected to the main tray member (230*a*).

\* \* \* \* \*